United States Patent Office 3,260,586
Patented July 12, 1966

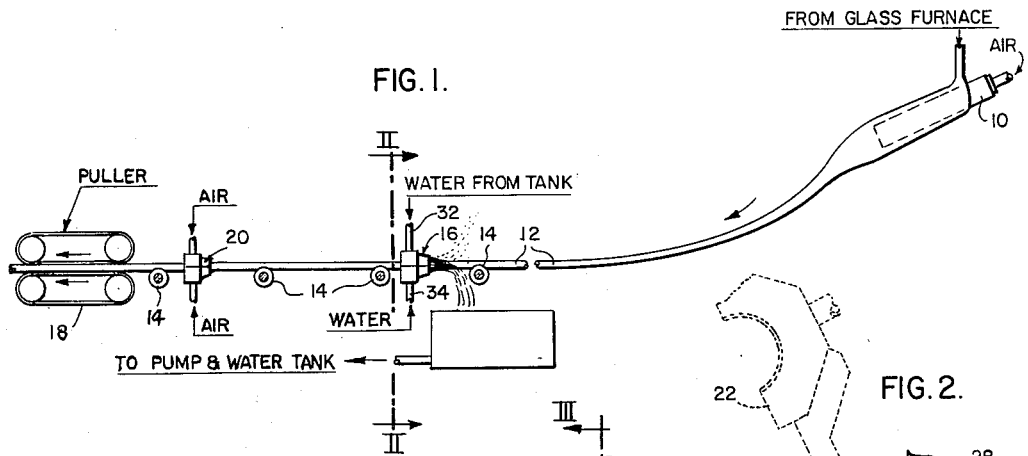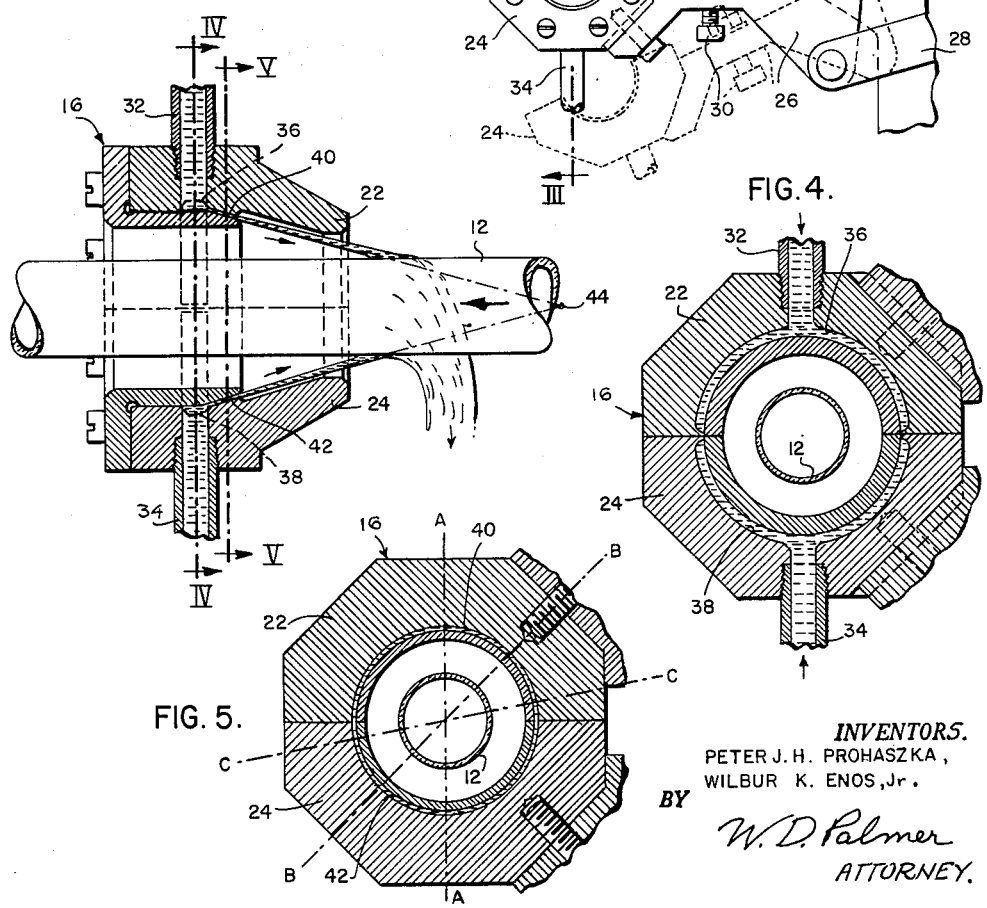
July 12, 1966   P. J. H. PROHASZKA ETAL   3,260,586
GLASS TUBE COOLING DEVICE AND METHOD
OF COOLING GLASS TUBING
Filed Oct. 22, 1962
INVENTORS.
PETER J. H. PROHASZKA,
WILBUR K. ENOS, Jr.
BY
W. D. Palmer
ATTORNEY.

3,260,586
GLASS TUBE COOLING DEVICE AND METHOD OF COOLING GLASS TUBING
Peter J. H. Prohaszka, Bloomfield, N.J., and Wilbur K. Enos, Jr., Fairmont, W. Va., assignors to Westinghouse Electric Corporation, Pittsburgh, Pa., a corporation of Pennsylvania
Filed Oct. 22, 1962, Ser. No. 232,023
15 Claims. (Cl. 65—86)

This invention relates to a device and method for cooling glass tubing and, more particularly, to a device and method for cooling glass tubing immediately after it is drawn.

In forming tubing from vitreous material such as glass, the melted glass is fed to a rotating mandrel such as is illustrated in FIG. 12 of U.S. Patent No. 2,433,116, dated December 23, 1947. The hot tubing after being formed is supported by a plurality of idler rollers and is moved at a substantially uniform rate by a conventional glass puller. After cooling, the tubing is cut into predetermined lengths by a conventional automatic cutting device. One of the disadvantages of such a system is that the drawn, continuous tubing must be cooled before it can be cut to size, and since the tubing is extremely hot immediately after it is formed, very long cooling lines have been required between the tube-forming mandrel and the tube-cutting mechanism. Such long cooling lines occupy an excessive amount of floor space. In addition, the production speed for drawing the tubing is limited by the space available for the cooling lines, since the tubing must be cooled before it can be cut to size. Forced air cooling of the tubing has been used, but is quite slow. Water cooling is much faster but this normally introduces uneven cooling effects, which in turn produces bows or other deformations in the tubing so that it cannot be cut to size with precision.

It is the general object of this invention to provide a method for rapidly cooling hot, drawn, vitreous tubing without distorting the tubing, whereby the tube cooling lines can be greatly shortened or the production speeds can be increased without lengthening the cooling lines.

It is another object to provide modifications of a method for rapidly and evenly cooling drawn vitreous tubing, while still hot, without distorting the tubing.

It is a further object to provide an improved apparatus for cooling hot, drawn, vitreous tubing without distorting the tubing.

The aforesaid objects of the invention, and other objects which will become apparent as the description proceeds, are achieved by forming a water spray which is either substantially uniform throughout, or is so formed that substantially uniform amounts of water emanate from opposite sides of the formed spray. The tubing to be cooled follows a predetermined path and the water spray emanates from a discharge location which substantially encircles the predetermined path along which the tubing is moving. The spray converges generally toward a preselected point which is substantially equidistant from all portions of the encircling discharge location from which the spray is emanated. The tubing to be cooled is continually passed through the water spray discharge location and also through the formed water spray in such manner that the preselected point toward which the water spray is generally directed is positioned substantially on the longitudinal axis of the continuously moving tubing. In the preferred form of the invention, the water spray takes the form of a cone, with the spray directed toward the apex portion of the cone. There is also provided a tube cooling mechanism for cooling tubing wherein the mechanism incorporates a generally circular orifice which surrounds the predetermined path of the tubing. Water is directed from this orifice to form a conical-shaped water spray, which effects the cooling of the tubing in a very even and rapid fashion by contact and evaporation.

For a better understanding of the invention, reference should be had to the accompanying drawings wherein:

FIG. 1 is a diagrammatic view of the tube forming, tube cooling, and tube pulling line;

FIG. 2 is a sectional view, taken on the lines II—II in FIG. 1, in the direction of the arrows, showing the tube cooling mechanism;

FIG. 3 is a sectional view of the tube cooling head taken on the lines III—III in FIG. 2, in the direction of the arrows, showing the tube cooling operation with the water spray emanating onto the tubing being cooled;

FIG. 4 is a sectional view of the tube cooling head taken on the lines IV—IV in FIG. 3, in the direction of the arrows, showing the arrangement of the water feeding manifold; and, FIG. 5 is a sectional view taken on the lines V—V in FIG. 3, in the direction of the arrows, showing tube-encircling discharge orifices which form a part of the tube cooling head.

With specific reference to the form of the invention illustrated in the drawings, the glass constituents are first melted in a conventional glass furnace (not shown) and are fed from the furnace to a rotating mandrel tube former 10, such as described in the aforementioned U.S. Patent No. 2,433,116. The drawn tubing 12 is supported by idler rollers 14. In order to expedite the cooling of the drawn tubing, the tubing is passed through an aperture provided through the cooling head 16, which will be described in greater detail hereinafter. The formed tubing is continuously pulled along the cooling line means of a conventional tube puller 18, after which it is cut to predetermined lengths, with the conventional cutting mechanism not shown. To facilitate proper operation of the tube puller 18, the water which is used to cool the tubing desirably is removed therefrom by means of an air knife 20. Most of the cooling water is caught by a reservoir tank, and is repumped through the cooling head 16.

The usual glass which is cooled in accordance with the present invention is soda-lime silica glass, as is commonly used in fluorescent lamp bulbs. It should be understood, however, that the present invention can be used to cool any type of vitreous tubing material immediately after it has been drawn.

Referring to FIG. 2, in order to facilitate initially inserting the tubing through the cooling head, the head 16 is formed in two parts, an upper half housing assembly 22 and a lower half housing assembly 24. When the tube is first drawn, the two assemblies 22 and 24 are adapted to be opened by means of conventional pivoted levers 26 and associated actuating rods 28, to facilitate the insertion of the hot tubing 12 therebetween. The open position of the upper and lower assemblies 22 and 24 is shown in dotted lines in FIG. 2, and the closed or operative position of these assemblies 22 and 24 is shown in solid lines in FIG. 2. In the embodiment as shown, the closed positioning of these assemblies 22 and 24 is determined by an adjustable spacing gauge 30.

Referring to FIG. 3, the two assemblies 22 and 24 are substantially identical and water is introduced through the upper inlet pipe 32 and the lower inlet pipe 34. As shown in FIG. 4, the inlet pipes 32 and 34 respectively connect to an upper distribution manifold 36 and a lower manifold 38, which in turn communicate with an upper discharge orifice 40 and a lower discharge orifice 42. The discharge orifices 40 and 42 substantially encircle the predetermined path along which the tubing is moving. When water is introduced through the inlet pipes 32 and 34, it flows through the manifolds 36 and 38 and in the discharge orifices 40 and 42 and emanates therefrom as a converging fine spray directed generally toward a preselected point which is substantially equidistant from all portions of the orifices 40 and 42.

In the preferred form of the invention, the discharge orifices 40 and 42 form the base portion of a right circular cone, with the spray generally directed toward the apex portion 44 of this cone. The tubing is passed through the spray so that the apex portion 44 of the cone, shown in dotted lines in FIG. 3, forms a fixed point which is located substantially on the longitudinal axis of the moving tubing 12. In this manner, the tubing is substantially uniformly cooled in a rapid and even fashion, thereby eliminating any bends or distortion of the tubing during the cooling. The tubing 12 is desirably fed toward the cone apex portion 44 so that this apex portion 44 intersects the longitudinal axis of the moving tubing 12 before such apex-intersected tubing portion passes through the plane of the orifices 40 and 42. Preferably the angle subtended by the apex cone portion 44 is approximately 30°.

As a specific example, in order to cool a soda-lime-silica glass tube having an outside diameter of one and one-half inches and a wall thickness of 0.035 to 0.041 inch, water is forced through the inlet pipes 32 and 34 at a pressure of thirty-two p.s.i., and a velocity of twelve gallons per hour. The circle formed by the discharge orifices 40 and 42 has a diameter of two and three-quarter inches. In the embodiment as shown, the water spray will be substantially uniform throughout since the water pressure in the manifolds 36 and 38 will be substantially uniform. If these manifolds 36 and 38 were made somewhat smaller, however, the formed spray would not necessarily be uniform because of pressure drops encountered in these manifolds 36 and 38. In such a case, however, the water which forms the opposite sides of the spray would emanate from opposing portions of the orifices 40 and 42 at a substantially uniform pressure, because of the positioning of the water inlets 28 and 30. For example, referring to FIG. 5, any non-uniformities in the water pressure in the manifolds 36 and 38 will still result in an equal amount of water emanated through the orifice 40 proximate to the line A—A and through the orifice 42 proximate to the line A—A. The same will be true for water emanated through the respective orifices 40 and 42 proximate to lines B—B and also to lines C—C, since the upper and lower assembly portions 22 and 24 of the cooling head 16 are symmetrical.

The foregoing specific embodiment is subject to considerable modification. For example, while the water spray preferably is directed into the form of a cone, it could be formed as a spray confined substantially to one plane, which would converge toward the tubing. Also, when the spray is directed into the configuration of a cone, as in the preferred embodiment, the angle subtended by the apex portion of such formed cone can be modified considerably from the preferred thirty degrees.

The conventional tube puller 18 is formed of two contra-rotating belts, which move the tubing therebetween while simultaneously imparting a rotation thereto to match the rotation given to the tubing by the mandrel 10. In some cases, residual water from the cooling head 16 may adhere to the tubing 12 and impair the operation of the tube puller 18. To remove this residual water, it is preferred to include an air knife 20 between the cooling head 16 and the tube puller 18. This air knife 20 can be identical to the cooling head 16, except that air is forced through the corresponding orifices of the air knife 20.

In the preferred form of the invention as described hereinbefore, the water is discharged from the cooling head as a fine spray. As an alternative embodiment, the cooling head could also be designed to discharge the water spray therefrom as an atomized, air-water mixture. The resulting atomized water spray would have the same cooling effect as the fine spray.

It will be recognized that the objects of the invention have been achieved by providing an improved method for rapidly and evenly cooling vitreous tubing, while still hot, without distorting the tubing. In addition, there has been provided an improved cooling mechanism for rapidly and evenly cooling drawn tubing while still hot, without distorting the tubing.

While one best embodiment of the invention has been illustrated and described in detail, it is to be particularly understood that the invention is not limited thereto or thereby.

We claim as our invention:

1. In the method of drawing glass tubing and rapidly and evenly cooling the moving, hot tubing immediately after drawing, without imparting distortion into the tubing, the improvement which comprises, forming a substantially uniform water spray having a predetermined rate of flow and radially directed from substantially all portions of a peripheral location of predetermined dimensions and generally toward a centrally disposed location, and continuously axially passing the tubing to be cooled through the centrally disposed location toward which the formed water spray is directed.

2. In the method of drawing glass tubing and rapidly and evenly cooling the moving, hot tubing immediately after drawing, without imparting distortion into the tubing, the improvement which comprises, forming a substantially uniform water spray directed to radially converge from a generally circular discharge location, and continuously passing the axial portion of the tubing substantially through the central portion of the generally circular discharge location from which the water spray is directed.

3. In the method of drawing glass tubing and rapidly and evenly cooling the hot tubing which is continuously moving along a predetermined path immediately after drawing, without imparting distortion into the tubing, the improvement which comprises: directing water having a predetermined rate of flow to emanate as a water spray from a spray-discharge location substantially encircling the predetermined path along which the tubing is moving, and to converge generally toward a preselected point which is substantially equidistant from all portions of the encircling spray-discharge location, with the flow of formed water spray emanated from opposite sides of the encircling spray-discharge location being substantially uniform; and continuously passing the tubing to be cooled through the encircling spray-discharge location and the formed water spray in such manner that the preselected point toward which the water spray is generally directed is positioned substantially on the longitudinal axis of the continuously moving tubing.

4. The method as specified in claim 3, wherein the discharge location is generally circular, and the water spray is emanated from the spray-discharge location in the form of a right-circular cone.

5. The method as specified in claim 4, wherein the cone apex to which the water spray is directed is positioned to intersect the longitudinal axis of the moving tubing before such apex-intersected tubing portion passes through the generally circular spray-discharge location.

6. The method as specified in claim 5, wherein the angle formed by the cone apex is approximately thirty degrees.

7. In the method of drawing glass tubing and rapidly and evenly cooling the hot tubing which is continuously moving along a predetermined path immediately after drawing, without imparting distortion into the tubing, the improvement which comprises, forming a substantially uniform water spray having a predetermined rate of flow and directed from a fixed substantially circular discharge location of predetermined dimensions and generally toward a point which defines the apex of a right-circular cone of which the discharge orifice forms the base, and continuously passing the tubing to be cooled through the circular discharge location and the formed water spray in such manner that the cone apex toward which the formed spray is generally directed forms a fixed point located substantially on the longitudinal axis of the moving tubing.

8. The method as specified in claim 7, wherein the cone apex toward which the water spray is directed is positioned to intersect the longitudinal axis of the moving tubing before such apex-intersected tubing portion passes through the base-portion of the right-circular cone described by the formed water spray.

9. The method as specified in claim 8, wherein the angle formed by the cone apex is approximately thirty degrees.

10. In combination with a glass-tube-forming line which includes tube-pulling means for continuously pulling the formed tube away from a tube-forming means, the improvement which comprises, a tube-cooling mechanism positioned between said tube-forming means and said tube-pulling means for rapidly and evenly cooling the drawn tube immediately after drawing while still hot, said tube-cooling mechanism comprising:

(a) housing means enclosing an aperture adapted to surround and receive the moving tubing;
(b) orifice means of substantially uniform dimensions disposed substantially completely around the circumference of the aperture enclosed by said housing means;
(c) water inlet means connecting to said housing means and in communication with said orifice means;
(d) water supply means for supplying water under a predetermined pressure head to said water inlet means; and
(e) said orifice means conformed to discharge water supplied to said inlet means by said water supply means as a substantially uniform water spray having the general conformation of a right-circular cone, with the cone apex positioned substantially on the longitudinal axis of the continuously moving tubing passing through the aperture provided in said housing means.

11. The device as specified in claim 10, wherein said housing means is formed as two half sections which enclose the aperture adapted to surrounding the moving tubing, and said two half sections are movable away from one another to facilitate insertion of the tube therebetween.

12. The device as specified in claim 10, wherein said orifice means is so positioned with respect to the moving tube that the cone apex toward which the water spray is directed intersects the moving tube before the moving tube passes through the aperture provided in said housing means.

13. The device as specified in claim 12, wherein the cone apex toward which the water spray is directed subtends an angle of approximately thirty degrees.

14. The combination as specified in claim 10, wherein air-blowing means is positioned between said tube-cooling mechanism and said tube-pulling mechanism, and said air-blowing means is operable to force a stream of air against the moving tubing to remove therefrom any residual water remaining thereon.

15. In combination with a glass-tube-forming line which includes tube-pulling means for continuously pulling the formed tube away from a tube-forming means; the improvement which comprises a tube-cooling mechanism positioned between said tube-forming means and said tube-pulling means for rapidly and evenly cooling the drawn tube immediately after drawing while still hot, said tube cooling mechanism comprising:

(a) housing means enclosing an aperture adapted to surround and receive the moving tubing;
(b) orifice means of substantially uniform dimensions disposed substantially completely around the circumference of the aperture enclosed by said housing means;
(c) water inlet means connecting to said housing means and in communication with said orifice means;
(d) water supply means for supplying water under a predetermined pressure head to said water inlet means; and
(e) said orifice means conformed to discharge water supplied to said inlet means by said water supply means as a water spray having the general configuration of a right-circular cone, with the cone apex positioned substantially on the longitudinal axis of the continuously moving tubing passing through the aperture enclosed by said housing means, and with the portions of the formed water spray emanated from opposite sides of the encircling spray discharge location being substantially uniform in rate of water flow.

References Cited by the Examiner

UNITED STATES PATENTS

| 1,521,390 | 12/1924 | Reynolds | 134—15 X |
| 1,892,126 | 12/1932 | Bailey | 65—187 X |
| 2,536,208 | 1/1951 | Nystrom | 134—15 |
| 2,591,304 | 4/1952 | Schuller | 65—192 |

DONALL H. SYLVESTER, *Primary Examiner.*

A. D. KELLOGG, *Assistant Examiner.*